(12) United States Patent
Pyörälä

(10) Patent No.: US 6,185,417 B1
(45) Date of Patent: Feb. 6, 2001

(54) SYSTEM FOR SAVING AND READING TEXT MESSAGES

(75) Inventor: Reijo Pyörälä, Jääli (FI)

(73) Assignee: Nokia Mobile Phones Limited, Espoo (FI)

(*) Notice: Under 35 U.S.C. 154(b), the term of this patent shall be extended for 0 days.

(21) Appl. No.: 09/015,574

(22) Filed: Jan. 30, 1998

(30) Foreign Application Priority Data

Jan. 31, 1997 (FI) .................................................. 970410 U

(51) Int. Cl.⁷ ...................................................... H04B 7/00
(52) U.S. Cl. ............................................ 455/412; 466/558
(58) Field of Search .................................... 455/412, 418, 455/419, 422, 458, 550, 466, 557, 558, 575, 186.1

(56) References Cited

U.S. PATENT DOCUMENTS 5,842,141 * 11/1998 Vaihoja et al. ........................ 455/466
5,956,653 * 9/1999 Lahti ..................................... 455/558

FOREIGN PATENT DOCUMENTS

WO 96/03723   2/1996 (WO) .

OTHER PUBLICATIONS

Digital celluar telecommunications system (Phase 2); Specfication of the Subscriber Identity Module—Mobile Equipment (SIM—ME) interface (GSM 11.11).

Digital cellular telecommunications system (Phase 2); Technical realization of the Short Message Service (SMS) Point-–to-Point (PP) (GSM 03.40).

* cited by examiner

Primary Examiner—Thanh Cong Le
(74) Attorney, Agent, or Firm—Perman & Green, LLP

(57) ABSTRACT

A start-up operation of devices using smart cards, and more precisely to the initialization procedure of smart cards is used in mobile stations during the start-up of the mobile station. The invention is based on the realization that information of the REPLACE-type of messages can be dealt with more quickly if the information of the type of the message already occurring once in the TP-PID byte of the record is added to the first byte of the record, the STATUS byte, whereby messages of the REPLACE type can be sought by the SEEK command of the SIM card. When this procedure is used in the start-up, there is no need to read all the records of the file containing the SMS messages on the SIM card in order to find the REPLACE-type of messages.

9 Claims, 3 Drawing Sheets

SYSTEM FOR SAVING AND READING TEXT MESSAGES

BACKGROUND

1. Field of the Invention

The invention relates to the start-up operation of devices using smart cards, or more precisely, to the initialization operations of smart cards used in mobile stations during the start-up procedure of the mobile station.

2. Description of the Prior Art

The GSM mobile station system uses text messages (Short Message Service, SMS). Using the numerical keypad of the mobile station, for example, the user of the mobile station can write a short text message and send it to another mobile station user. The mobile station receives text messages independently without the user's control, and so it is possible to receive messages even when the user is not near the mobile station, when the user for some other reason cannot pay attention to the mobile station or during a call. The general structure of the GSM system and the text message functions have been described in Michel Mouly, Marie-Bernadette Pautet, "The GSM System for Mobile Communications", ISBN 2-9507190-0-7, Palaiseau 1992.

If the mobile station is switched off, the incoming message does not disappear but stays in a Short Message Service Centre, SMSC, to wait for the starting of the mobile station. The Home Location Register, HLR, of the mobile station gets the information that there are messages waiting for contact by the mobile station in the Short Message Service Centre. When the mobile station is switched on, it contacts the network via the nearest base station and performs the initialization operations mentioned in the recommendation GSM 11.11, among other things. When the mobile station informs the network of its starting up, the Home Location Register sends a notice of this to the Short Message Service Centres, which have messages waiting. When the Short Message Service Centres have received the notice, they send the text messages to the mobile station.

The mobile station saves the incoming messages and messages written by the user to a SIM card in the mobile station, on which SIM card they remain even when the mobile station is switched off. The messages are saved in a certain file intended for text messages, one message in one record of the file. The first byte of the record is a so-called STATUS byte, which contains, among other things, information about whether the record is empty, whether it has a received or transmitted message, and if the message has been received from the network, whether the user has read the message or not. The meaning and contents of the information and files to be saved on the SIM card are described in the GSM recommendation GSM 11.11 and the corresponding standard proposal of ETSI, ETS 300 608 (August 1996) and the recommendation GSM 03.40.

There is one special type of SMS messages, the REPLACE type, which is treated by the mobile station differently from other SMS messages. Ordinary, received SMS messages are saved in a suitable, empty record on the SIM card, but messages of the REPLACE type are saved in the place of another REPLACE-type of message, if another message of the same REPLACE type and sent by the same user has been saved on the SIM card. Operations like this make it possible to use automatic status notices, for example when the user of the mobile station needs real-time information of the status of a production process. Then the production control system can send at desired intervals a text message which gives the values of certain important parameters. Thus the user can check the status of the process by reading the newest message in his mobile station. By using messages of the REPLACE type in an application like this, the memory of the SIM card is prevented from being filled up by frequently occurring messages, of which only the latest is necessary.

When a mobile station receives a text message, it checks the type of the message. An SMS message includes a group of parameters, of which the TP-PID byte (TP-Protocol-Identifier) is described here. The TP-PID byte identifies whether the message in question is of the REPLACE type, and if it is, what the more precise REPLACE type is. The various REPLACE types of messages have been described in the recommendation GSM 03.40, which describes all the different meanings and coding methods of the TPPID byte. In this document, the concept REPLACE-type message means a message which is of one of the REPLACE types mentioned in the GSM recommendations. If the message is not of the REPLACE type, it is saved in the usual manner in a suitable, empty record. If the message is of the REPLACE type, the mobile station must check if any of the earlier saved messages has the same identifying information, which includes the ID of the sender and the REPLACE type. If a message like this is found, the mobile station saves the newly arrived message in the place of the old message, and otherwise the mobile station saves the message arrived as normally on the SIM card and saves the information of the message arrived in its own memory for possible later reception of a REPLACE message of the same type.

When in operation, the mobile station typically retains in its memory some of the identification data of REPLACE-type messages as required by the recommendations. When the use of the mobile phone is started and power is switched on, the mobile station must determine whether there are REPLACE-type messages on the SIM card and read the identification data of such messages in its memory. In the prior art technique, this requires reading all the records of the SMS message file in order to find out the contents of the TPPID byte of each record. However, reading all the records takes a lot of time. The slowness of this stage can cause problems when a SMSC has messages waiting. As was described above, the HLR informs all SMSCs which have messages waiting when the mobile station is started, whereupon these SMSCs send these messages to the mobile station. If the mobile station is still reading the messages saved on the SIM card when these messages arrive, an error may occur, resulting in a loss of messages.

SUMMARY OF THE INVENTION

It is the object of the invention to implement a system by which the initialization process of the SMS messages saved on the SIM card takes less time than in the prior art technique. Another object of the invention is to implement a system by which the information of REPLACE-type messages that may exist in the memory of the SIM card can be found out more quickly when the mobile phone is started than is possible with the established techniques.

The objects are achieved by adding to the STATUS byte of a REPLACE-type message a marking that the message is of the REPLACE type, using this information in the starting up by seeking by a certain command of the SIM card records which have this marking in their STATUS byte, and by reading only these records.

The system according to the invention is characterized in that which is specified in the characterizing part of the independent system claim. The method according to the invention is characterized in that which is specified in the characterizing part of the independent method claim. The mobile communication means according to the invention is characterized in that which is specified in the characterizing part of the independent claim directed to a mobile communication means. The dependent claims describe further advantageous embodiments of the invention.

The invention is based on the realization that information contained in REPLACE-type of messages can be dealt with more quickly if the information of the type of the message that already occurs once in the TP-PID byte of the record is added to the STATUS byte of the record, whereby the REPLACE-type of messages can be ought by the SEEK command of the SIM card. If this procedure is used in the starting-up, there is no need to read all the records of the SMS message file on the SIM card.

BRIEF DESCRIPTION OF THE DRAWINGS

In the following, the invention will be described in more detail with reference to the preferred embodiments presented by way of example and to the accompanying drawings, in which.

The same reference numbers and markings are used in the figures for corresponding parts.

DETAILED DESCRIPTION

In version 4.18.0 of the recommendation GSM 11.11 and in the corresponding standard proposal ETS 300 608 (August 1996) of ETSI, the meanings of the bits of the STATUS byte of the SMS record are defined as follows:

| b3 | b2 | b1 | Meaning |
| --- | --- | --- | --- |
| 0 | 0 | 0 | empty record |
| x | x | 1 | there is a message in the record |
| 0 | 0 | 1 | a message received by the mobile station, which has been read by the user |
| 0 | 1 | 1 | a message received by the mobile station, which has not been read by the user |
| 1 | 0 | 1 | a message to be sent from the mobile station, which has already been sent |
| 1 | 1 | 1 | a message to be sent from the mobile station, which has not yet been sent |

Here 'x' means any value, b1 is the least significant bit of the byte and bits b4–b8 are reserved for later use.

In the system according to the invention, at least one of the bits b4–b8 is used to indicate information that already once exists in the record, that is, the information whether the message saved is of the REPLACE type. This can be indicated, for example, by bit b4, whereby the value '1' of the bit b4 means that the message is of the REPLACE-type, and the value '0' means that the message that possibly is in the record is not of the REPLACE-type. It is clear to a person skilled in the art that this is not the only possible way of marking suitable for this purpose. Other bits of the bits b4–b8 can also be used for marking a REPLACE-type of message, and the meaning of the value of the bit can also be defined as the opposite.

In a system according to the invention, information of the REPLACE type of the message can be added to the STATUS byte by means of more than one bit. In this embodiment, the STATUS byte can also carry exact information as to which of the REPLACE types mentioned in the GSM recommendations is the type of the message.

When an SMS message of the REPLACE type is being saved on the SIM card, the system according to the invention marks the information of the REPLACE type of the message in the STATUS byte of the saving record in one of the above described or a similar manner. With regard to the implementation of the invention, it is necessary to mark only messages of the REPLACE type received by the mobile station in the manner mentioned.

Figure 1:
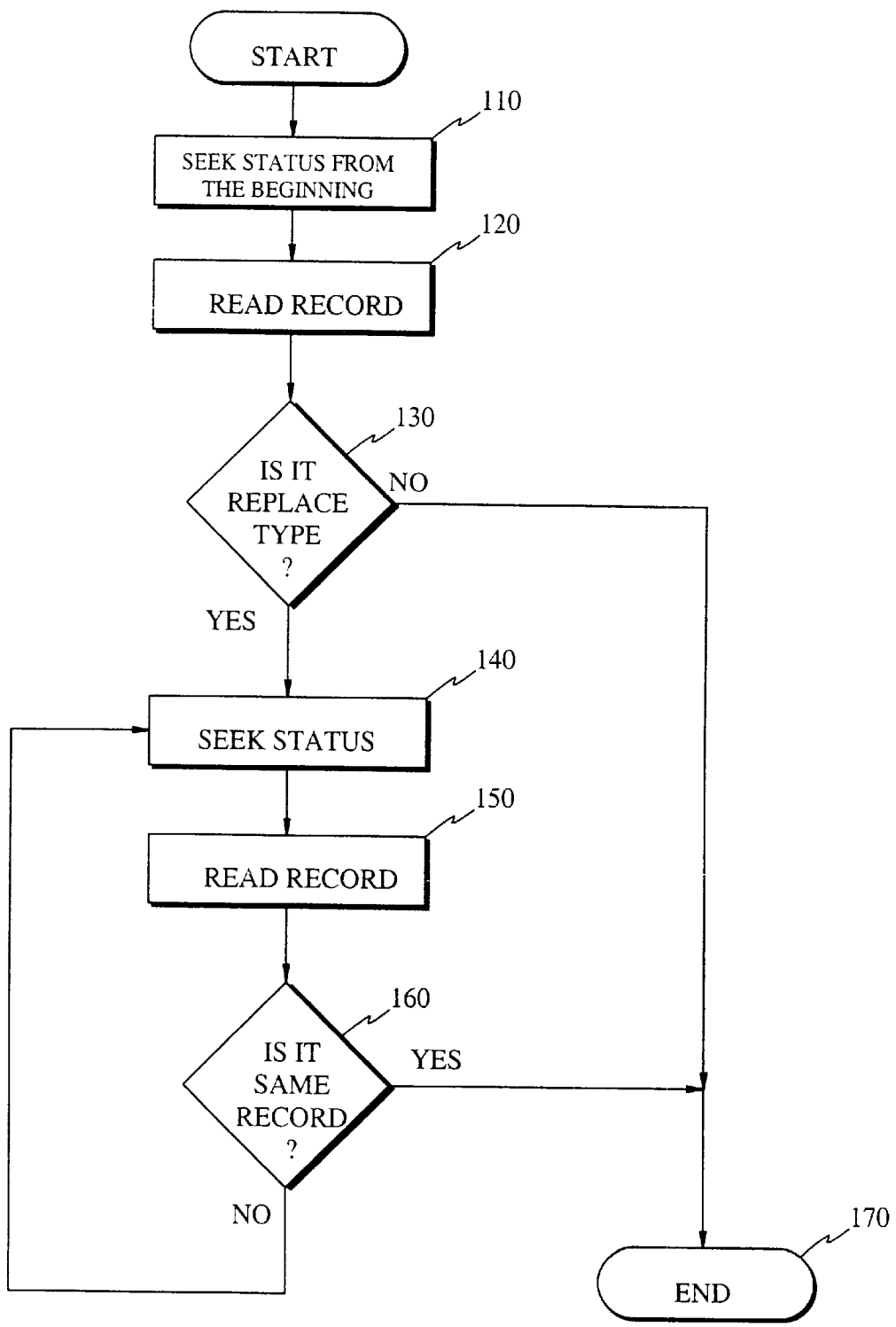
FIG. 1 shows the operation of one preferred embodiment of the invention.

An example of one preferred embodiment of the invention is shown in FIG. 1. This form of application is particularly suitable for reading information from older SIM cards in accordance with the 'Phase 1' recommendations, which SIM cards do not return any value as the result of the SEEK command. Firstly, the SIM card is given the SEEK command (110), which seeks the first record, at the beginning of which there is the byte or the group of bytes given to the SEEK command as a parameter. In this embodiment, this seek parameter corresponds to a way of marking the STATUS byte described above or other corresponding way of marking. In this embodiment, the SEEK command is at this stage also given a parameter, which guides the SIM card to start seeking from the first record of the file containing the SMS messages. After the execution of the SEEK command, the record pointer of the SIM card points at a record from which the byte that was being sought was found, or to the same record as before the execution of the SEEK command, it the byte that was being sought was not found.

If the SIM card is of the old, 'Phase 1' type, it does not return any value after the execution of the SEEK command. Then the system must read (120) the record at which the record pointer points. If the record is not (130) of the REPLACE type, then it is known that the SMS message file does not contain a message of the type that was being sought, and the seeking can be stopped (170). If the record is of the REPLACE type, then the seeking is continued with a new SEEK command (140). This time the seeking is continued from the next record onward, including the next record. After the execution of the SEEK command, the system reads (150) the record to which the record pointer points at the moment. If this record is the same as the record read at the previous time, there are no more records of the REPLACE type in the SMS message file. Seeking can then be stopped (170). If the record read at step 150 is a new record, the system returns to step 140 at which the SEEK command was given. Steps 140, 150 and 160 are repeated until no new records are found, and the seeking can be stopped at 170.

Figure 2:
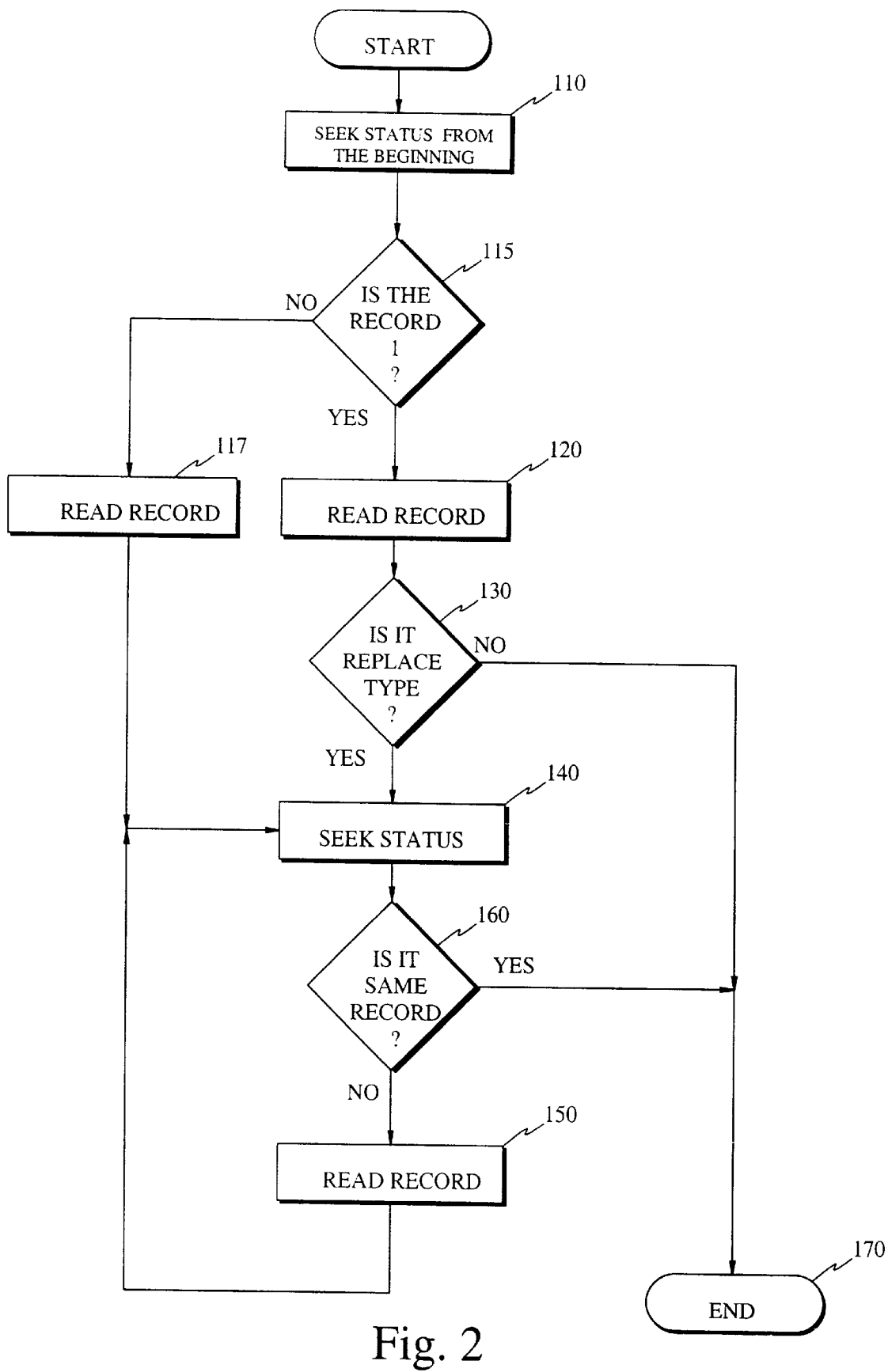
FIG. 2 shows the operation of another preferred embodiment of the invention.

An example of another preferred embodiment of the invention is shown in FIG. 2. The method shown in the figure is particularly suitable for reading the information of newer SIM cards in accordance with the 'Phase 2' recommendations. The method of FIG. 2 utilizes the record number returned by the SIM card of the 'Phase 2' recommendations after the SEEK command and thus avoids carrying out certain operations according to the procedure of FIG. 1.

At first, the SIM card is given the SEEK command (110), which seeks the first record at the beginning of which there is the byte or the group of bytes given to the SEEK command as a parameter. In this implementation, this seek parameter corresponds to one of the marking methods described above or another corresponding method of marking the STATUS byte. In this embodiment, the SEEK command is at this stage also given a parameter, which guides the SIM card to start seeking from the first record of the file containing the SMS messages. After the execution of the SEEK command, the record pointer of the SIM card points at a record from which the byte that was being sought was found, or at the same record as before the execution of the SEEK command, if the byte that was being sought was not found.

If the SIM card is of the newer, 'Phase 2' type, after the execution of the SEEK command it returns the number of the record at which the record pointer points. The next step is to check (115) the number of the record returned by the SIM card.

If the number of the record returned by the SIM card is not the same as the number of the first record, the STATUS byte that was being sought has been found. If the SIM card returns the number of the first record, there are two possibilities: either the first record is of the REPLACE type or there are no records of the type that was being sought in the SMS message file. In order to determine this, the system reads (120) the first record. If the record is not of the REPLACE type, there are no records of the type that was being sought in the SMS message file, in which case the seeking can be stopped (170). If the record is of the REPLACE type, the seeking is continued with a new SEEK command (140).

If it was found at step 115 above that the number of the record returned by the SIM card is not the same as the number of the first record, a record of the type that was being sought has been found. Then the system reads (117) the record, and the seeking is continued with a new SEEK command at step 140.

At step 140, the seeking is continued from the next record onward, including the next record. After the execution of the SEEK command the system checks if the record found is the same as the record found at the previous time. This can be done simply by comparing the record numbers returned by the SIM card. If this record is the same as the record read at the previous time, there are no more records of the REPLACE type in the SMS message file, and the seeking can be stopped at 170. If this is not the case, the system reads (150) the record to which the record pointer points at the moment and returns to step 140 at which the SEEK command was given.

On the basis of the way of marking the records of the REPLACE type, the procedures shown in FIGS. 1 and 2 may have to be carried out more than once. For example, if the REPLACE-type of records are marked with the bit b4 of the STATUS byte so that the value 1 of the bit b4 corresponds to a REPLACE-type of record and the value 0 to an ordinary record, the STATUS byte of a received message of the REPLACE type can be either 00001001 or 00001011 depending on whether the user of the mobile station has read the message or not. When the SEEK command of the standard proposal ETS 300 608 (August 1996) of ETSI or the corresponding GSM recommendation GSM 11.11 version 4.18.0 is used, the bytes 00001001 and 00001011 must be sought separately. If the standard is extended later so that a bit mask can be given to the SEEK command as the byte being sought, whereby it is possible to seek, for example, a byte in which the value of the bit b4 is 1, all the messages of the REPLACE type can be sought by one procedure like the one shown in FIG. 1 or FIG. 2.

Figure 3:
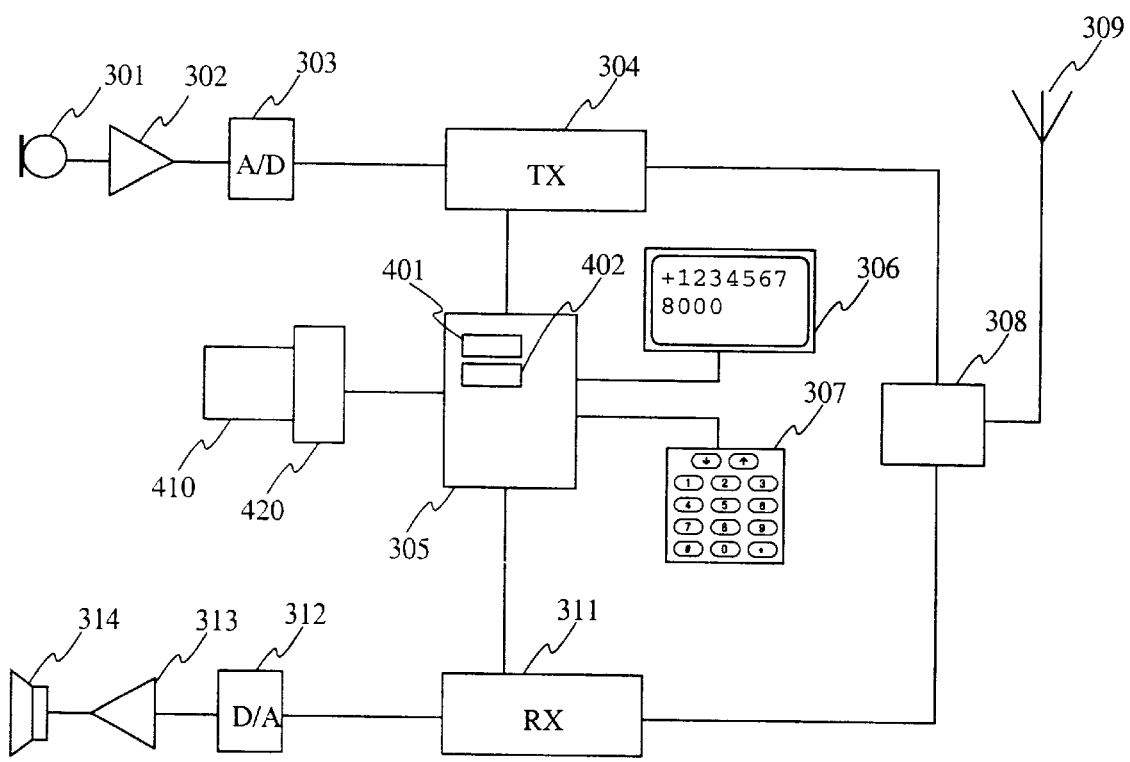
FIG. 3 shows the block diagram of an advantageous embodiment of the invention.

FIG. 3 shows a block diagram of a digital mobile communication means according to an advantageous embodiment of the invention. The mobile communication means comprises a microphone 301, keyboard 307, display 306, earpiece 314, antenna duplexer or switch 308, antenna 309 and a control unit 305, which all are typical components of conventional mobile communication means. Further, the mobile communication means contains typical transmission and receiver blocks 304, 311. Transmission block 304 comprises functionality necessary for speech and channel coding, encryption, and modulation, and the necessary RF circuitry for amplification of the signal for transmission. Receiver block 311 comprises the necessary amplifier circuits and functionality necessary for demodulating and decryption of the signal, and removing channel and speech coding. The signal produced by the microphone 301 is amplified in the amplifier stage 302 and converted to digital form in the A/D converter 303, whereafter the the signal is taken to the transmitter block 304. The transmitter block encodes the digital signal and produces the modulated and amplified RF-signal, whereafter the RF signal is taken to the antenna 309 via the duplexer or switch 308. The receiver block 311 demodulates the received signal and removes the encryption and channel coding. The resulting speech signal is converted to analog form in the D/A converter 312, the output signal of which is amplified in the amplifier stage 313, whereafter the amplified signal is taken to the earpiece 314. The control unit 305 controls the functions of the mobile communication means, reads the commands given by the user via the keypad 307 and displays messages to the user via the display 307.

According to an advantageous embodiment of the present invention, the mobile communication means further comprises a smart card connector unit 420 for connection of smart cards 410, for example SIM cards. FIG. 3 illustrates the situation, when such a smart card is present in the connector unit 420. The control unit 305 controls the reception and transmission of text messages as well as saving of the messages into the smart card and searching and retrieving messages from the smart card. The control unit takes care of the special treatment required by certain types of text messages as described previously in connection with FIGS. 1 and 2.

The control unit 305 comprises means 401 for marking the messages of the certain type or types in the status byte of the saving record of the message by adding certain information to the status byte as described previously. For example, the means 401 for marking the messages may set a certain bit or certain bits of the status byte to one. The control unit 305 further comprises means 402 for controlling the search of the certain type or types of messages from the smart card during the start-up of the mobile communication means. These means 402 for controlling the search preferably invoke a seek command of the smart card for searching through the record status bytes in the smart card, as described previously. The control unit 305 preferably comprises a microprosessor and a memory unit (not shown in the FIG. 3), whereby said means 401, 402 can be realized as programs in the memory unit, which programs are processed by the microprocessor. The means 401, 402 can be separate functional units. However, the invention is not limited to the means being separate, since the required functionality can be incorporated in a single functional unit or program as well, or be realized as more than two functional units or programs.

The system according to the invention shortens the initialization procedure of the start-up phase of the mobile station, whereby it becomes less likely that the received SMS message would be lost during the start-up. The system according to the invention speeds up the start-up operations especially when there are no REPLACE-type of messages on the SIM card, whereby there is no need to read all the messages saved on the SIM card to find out if they are of the REPLACE type, as in the case of established techniques.

In the foregoing, the GSM system has only been used as an example. It is clear to a person skilled in the art that the invention can also be applied to other mobile station systems, which use text messages and smart cards such as the SIM cards for saving text messages, like the mobile station systems according to the standards DCS1800 and DCS1900. It is also clear that instead of the STATUS byte, some other corresponding byte indicating the status of the record can be used in the invention, and instead of the SEEK command of the SIM card, some other similar command of a corresponding smart card can be used in the invention.

In the above, the invention has been described by way of example by messages of the REPLACE type. It is clear to a person skilled in the art that the invention can also be applied to other types of messages, at the saving stage of which information of the same type of messages saved earlier is needed.

What is claimed is:

1. A system for saving text messages of a certain type and reading them from a smart card in a mobile communication means in a situation when, during the saving procedure of the text messages of a certain type, information is needed about text messages of the same type possibly saved earlier, comprising means for adding information indicating that the message is of the certain type to a status byte of the saving record of each text message of the certain type to be saved on the smart card, means for seeking with a seek command of the smart card the messages of said certain type from the smart card on basis of record status bytes during the start-up procedure of the mobile communication means.

2. A system according to claim 1, comprising means for marking the message of said certain type by setting a certain bit of the status byte of the saving record as one.

3. A system as in claim 1 wherein the text messages of said certain type are replace type messages.

4. A method for reading text messages of a certain type from the smart card of the mobile station at the start-up stage of the mobile station, comprising steps in which using a seek command of the smart card to seek records which have a marking in the status byte indicating that the text message of said record is of said certain type;

reading the record found by the seek command;

checking the type of the record read, and if the type of the text message of the record is not said certain type, seeking records is stopped, and if the type of the text message of the record is said certain type, seeking records is continued.

5. A method according to claim 4, said continued seeking of records further comprises the steps of:

using the seek command of the smart card to seek records which bear a marking in the status byte indicating that the text message of said record is of said certain type, reading the record found by the seek command;

checking whether the record found is the same record as the one found in the previous search, and if the record is the same as the one found in the previous search, seeking records is stopped, and if the record is not the same as the one found in the previous search, seeking records is continued.

6. A method as in claim 4, wherein the text messages of said certain type are replace type messages.

7. A mobile communication means which is arranged to receive text messages and save the text messages on a smart card used in the mobile station, and which is arranged to save messages of a certain type in a different manner than other text messages, comprising means for adding information indicating that the message is of the certain type to a status byte of the saving record of each text message of the certain type to be saved on the smart card.

8. A mobile communication means as in claim 7, further comprising means for seeking with a seek command of the smart card the messages of said certain type from the smart card on the basis of record status bytes during the start up procedure.

9. A mobile communication means as in claim 7, wherein the text messages of said certain type are replace type messages.

* * * * *